United States Patent [19]

Williams

[11] Patent Number: 4,602,123

[45] Date of Patent: Jul. 22, 1986

[54] ARMORED CABLES AND FITTINGS FOR TEST PROBES

[76] Inventor: Robert A. Williams, 2721 White Settlement Rd., Fort Worth, Tex. 76107

[21] Appl. No.: 581,608

[22] Filed: Feb. 21, 1984

[51] Int. Cl.⁴ .............................................. H02G 15/00
[52] U.S. Cl. .................................................. 174/72 R
[58] Field of Search ...................... 174/50, 70 C, 71 R, 174/72 R, 72 C

[56] References Cited

U.S. PATENT DOCUMENTS 1,827,086  10/1931  Hunter ........................ 174/71 R X
1,909,136  5/1933   Thomas, Jr. ................. 174/50 X Primary Examiner—Laramie E. Askin
Attorney, Agent, or Firm—Arthur F. Zobal

[57] ABSTRACT

Armored cables and fittings provide high strength conduits for electrical leads for connection to test probes. Each of the fittings comprises a member having two opposite ends. A slot is formed through the member between its two opposite ends defining two spaced-apart structural portions extending from the same side of a base portion. An aperture extends through one or both of the structural portions between its end and the slot. A flexible hollow cable is secured to one or each of the structural portions at its end for communication with the slot by way of its aperture. The fittings are coupled together to provide intersecting passageways for electrical leads located in the cables. In addition, the fittings are connected to test probes for providing passageways for the electrical leads from the cables to the test probes.

20 Claims, 28 Drawing Figures

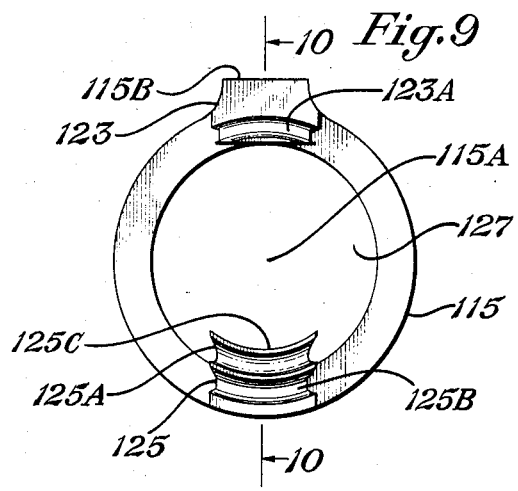
Fig. 9
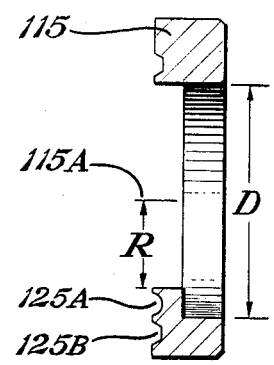
Fig. 10
Fig. 11
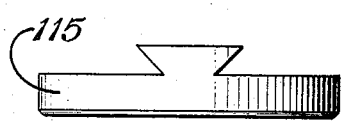
Fig. 12
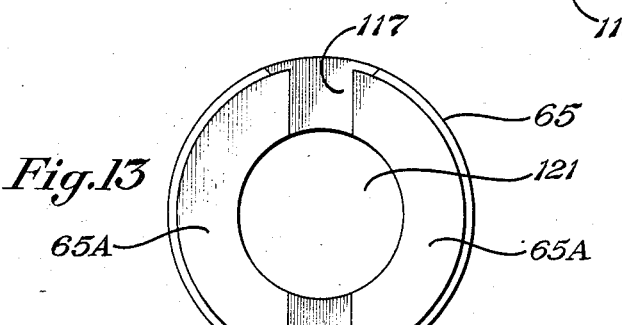
Fig. 13
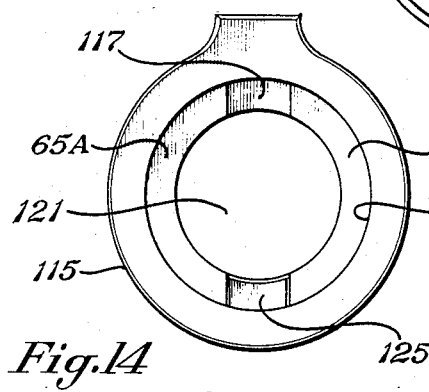
Fig. 14
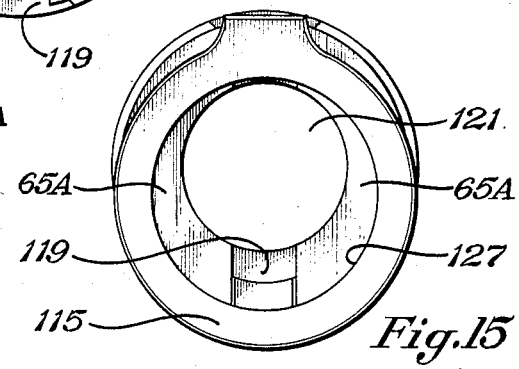
Fig. 15

ARMORED CABLES AND FITTINGS FOR TEST PROBES

SUMMARY OF THE INVENTION

It is an object of the invention to provide a unique fitting for connection to a flexible hollow cable for providing a high strength passageway for electrical leads.

The fitting comprises a member having two opposite ends. A slot is formed through the member between its two opposite ends defining two spaced-apart structural portions extending from the same side of a base portion. An aperture extends through one or both of the structural portions between its end and the slot. A flexible hollow cable is secured to one or each of the structural portions at its end for communication with the slot by way of its aperture.

It is another object of the invention to provide an easy and unique manner of coupling the fittings together to provide intersecting passageways for electrical leads located in the cables.

It is a further object of the invention to provide an easy and unique manner of coupling the fittings to test probes for providing high strength passageways for the electrical leads from the cables to the test probes.

BRIEF DESCRIPTION OF THE DRAWINGS

In FIG. 1, the movable sleeve of the test probe is in its forward position.

In FIG. 2, the locking ring is in its unlocked position.

In FIG. 5, the electrical components and the latching mechanism are not shown.

In FIG. 6, the movable sleeve is in its forward position and the locking ring is in its unlocked position.

FIG. 9 is a view of the forward end of the locking ring as seen from lines 9—9 of FIG. 5.

FIG. 10 is a cross sectional view of FIG. 9 taken along the lines 10—10 thereof.

FIG. 11 is a view of one edge of the ring of FIG. 9.

FIG. 12 is a view of the opposite edge of the ring of FIG. 9.

FIG. 13 is a rear end view of the movable sleeve of the test probe as seen along the lines 13—13 of FIG. 5.

FIG. 14 is a view of FIG. 6 taken along the lines 14—14 showing the locking ring in its unlocked position relative to the movable sleeve with the central tubular body removed.

FIG. 15 is a view of FIG. 7 taken along the lines 15—15 showing the locking ring in its locked position relative to the movable sleeve with the central tubular body removed.

In FIG. 22, electrical leads also are shown.

DESCRIPTION OF THE PREFERRED EMBODIMENTS

Figure 1:
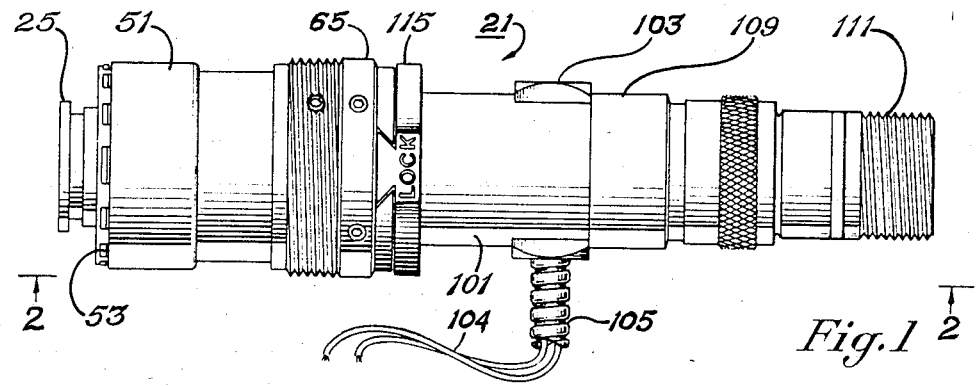
FIG. 1 is a side view of a test probe incorporating a locking apparatus claimed in my copending U.S. patent application entitled "Locking Apparatus for Test Probe" Ser. No. 581,610, filed Feb. 21, 1984, now U.S. Pat. No. 4,525,016.
Figure 2:
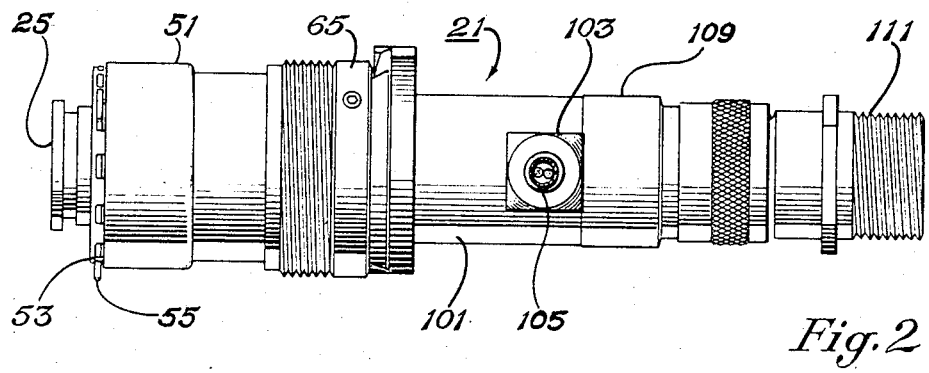
FIG. 2 is a side view of the test probe of FIG. 1 as seen from lines 2—2 of FIG. 1.
Figure 3:
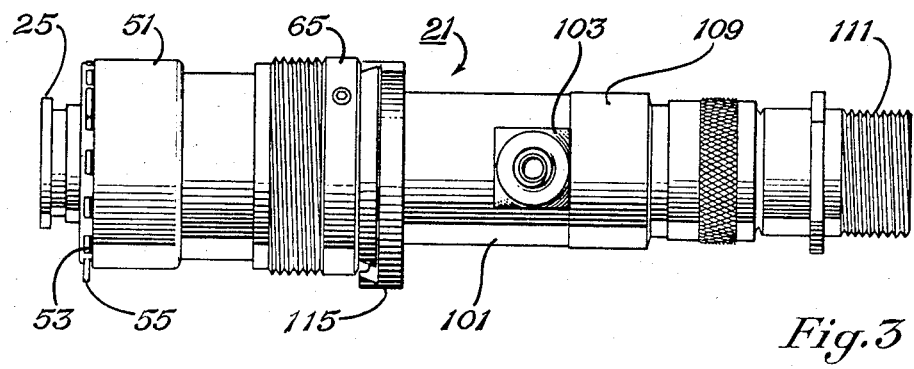
FIG. 3 is a side view similar to that of FIG. 2 of the test probe but with its locking ring in its locked position.
Figure 4:
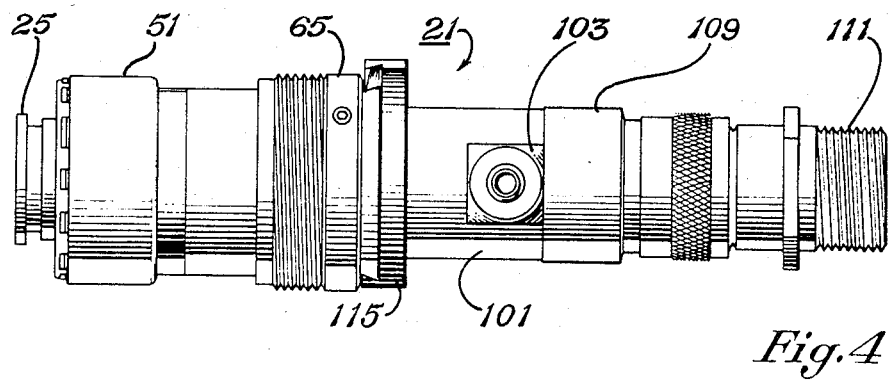
FIG. 4 is a side view of the test probe of FIG. 1 with its locking ring in its unlocked position and its movable sleeve in its rearward position.
Figure 5:
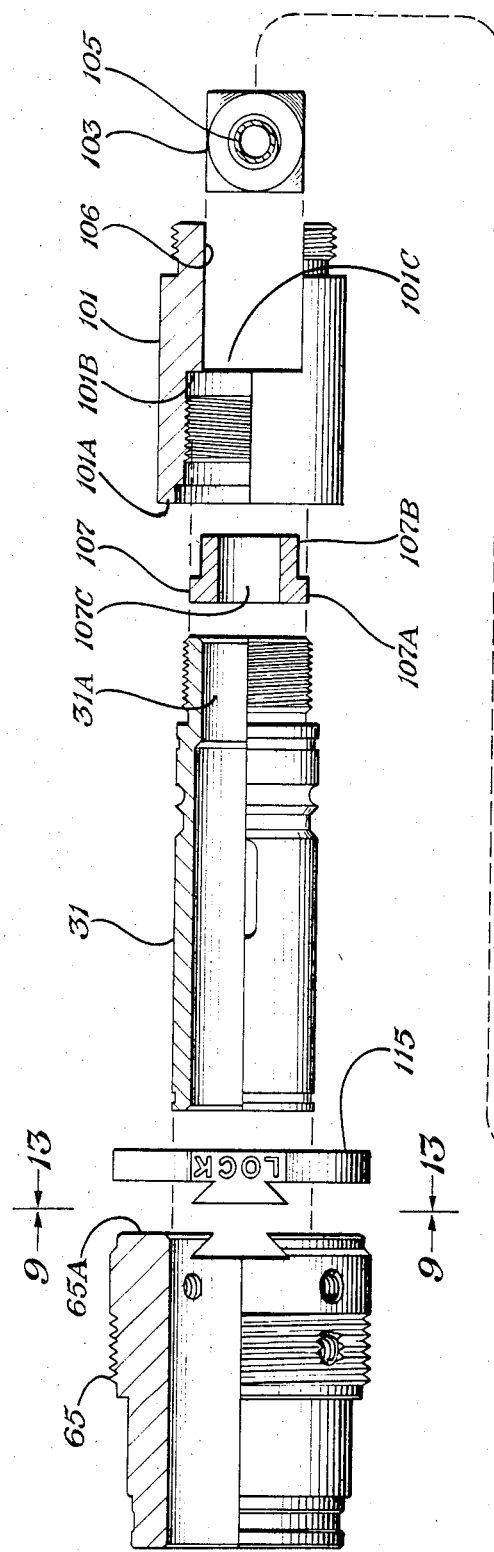
FIG. 5 is an exploded view of a portion of the structural components of the test probe.
Figure 5:
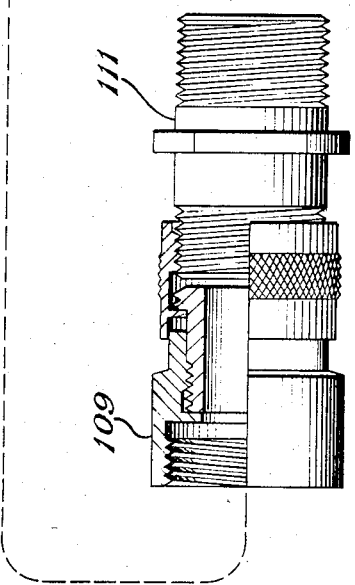

Referring now to FIGS. 1-15 of the drawings, a test probe and its locking mechanism will be described first. The test probe is identified at 21. It comprises a central tubular body or member 31 and an axially movable sleeve 65 located around the tubular body 31. The tubular body 31 is round in cross section. Sleeve 65 is a tubular sleeve also round in cross-section. The sleeve 65 may be moved axially to forward and rearward positions relative to the tubular body 31. An annular shell 51 is coupled to the forward end of the tubular body 31. The annular shell 51 has openings 53 through which latch elements 55 may be moved radially outward and inward when the sleeve 65 is moved axially forward and rearward respectively. A spring biased axially located electrical contact and a spring biased annular electrical contact extend forward through a central opening formed through the front end of the annular shell 51. The annular electrical contact surrounds and is spaced from the axially located electrical contact. In FIGS. 1-4 the annular electrical contact is shown at 25. Reference is made to U.S. Pat. No. Re 28,328 for a detailed description of the electrical contacts and one embodiment of an arrangement for moving the latches 55 radially outward and inward upon movement of the sleeve 65 to its forward and rearward positions. U.S. Pat. No. Re 28,328 is hereby incorporated into this application by reference. It is to be understood that the latches also may be of the type disclosed in U.S. Pat. No. 3,505,635 and this patent is hereby incorporated into this application by reference.

A tubular mounting member 101, round in cross section, is screwed to the rear end of the tubular body 31. The member 101 holds a block member 103 to which a flexible armored cable 105 is attached for providing a conduit for electrical leads for connection to the forward electrical contacts. In FIG. 1, the electrical leads of cable 105 are shown at 104. The block member 103 is located in a slot 106 formed through the rear of the member 101 and is held in place by a bushing 107 extending into a slot 108 of the member 103 and by another tubular member 109 screwed to the rear end of the member 101. A rear tubular member 111 is screwed to the rear of the member 109. A rear opening 113 formed through the member 103 provides a passageway for electrical leads extending to a connector for connection to test equipment.

Figure 6:
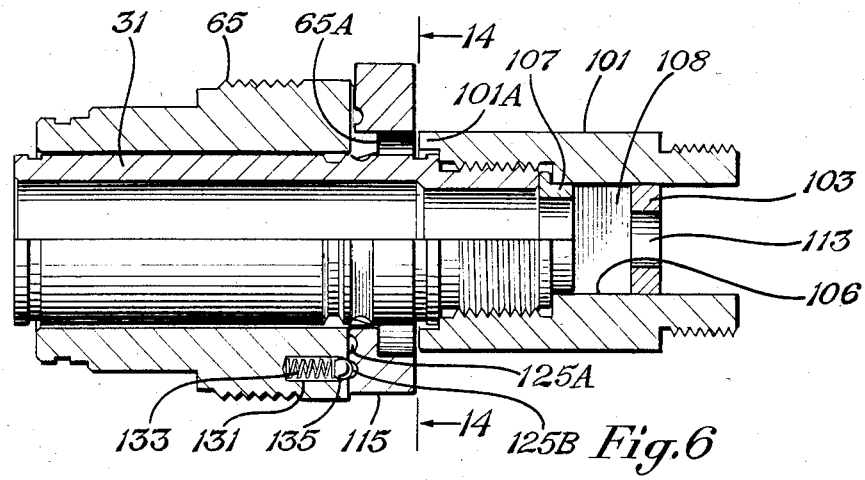
FIG. 6 is a partial cross sectional view of a portion of the components of FIG. 5 in their assembled position.
Figure 7:
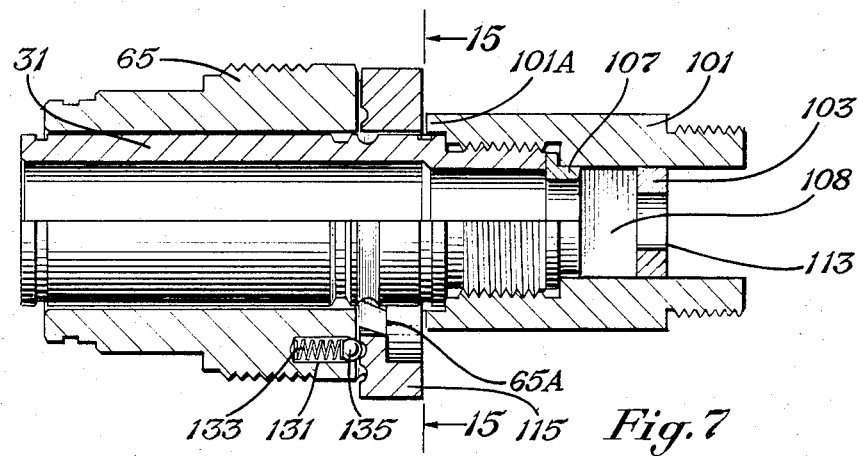
FIG. 7 is a partial cross sectional view similar to that of FIG. 6 with the movable sleeve of the test probe in its forward position but with and its locking ring in its locked position.

As shown in FIGS. 6 and 7, the forward end 101A of the member 101 is spaced from the rear end 65A of the sleeve 65 when the sleeve 65 is in its forward position. Located around the tubular body 31 and coupled to the rear end of the sleeve 65 is a ring shaped member 115. Referring to FIGS. 9 and 11-15 radially extending slots 117 and 119 are formed in the rear end 65A of the sleeve 65 on opposite sides of its central opening 121. Radially extending keys 123 and 125 are formed on the forward end of the ring shaped member 115 on opposite sides of its central opening 127. The cross sectional shape of the keys 123 and 125 correspond to the shapes of the slots 117 and 119 respectively and the keys 123 and 125 are located in slots 117 and 119 respectively for sliding movement therein. The keys and the slots couple the ring shaped member 115 to the rear of the sleeve 65 such that the ring shaped member will move axially with the sleeve 65 when it is moved to its forward and rearward positions. The keys and slots also allow the ring shaped member 115 to be moved to locking and unlocking positions in directions transverse or perpendicular to the central axis of the sleeve 65 and the tubular body 31. The ring shaped member 115 is movable to its locking position only when the sleeve 65 is in its forward position. As seen in FIGS. 7 and 15, when the ring shaped member 115 is moved to its locking position, the upper portion of the member 115 is moved between the upper portion of the rear end of the sleeve 65 and the upper portion of the forward end of the member 101 thereby blocking and preventing the sleeve 65 from being moved to its rearward position. When the ring shaped member 115 is moved to its unlocked position, its opening 127 is located in a position to allow the sleeve 65 to be moved to its forward and rear positions. As seen in FIGS. 6-9, key 125 has two arcuate shaped slots 125A and 125B formed in its forward end. A cylindrical shaped aperture 131 formed in the lower end of the rear end 65A of the sleeve 65 has a small compression spring 133 for urging a small ball 135 into either the slot 125A or the 125B when the ring shaped member 115 is moved to either its locking or unlocking positions. The purpose of the spring 133 and ball 135 and the slots 125A and 125B is to hold the ring shaped member 115 in either of its locking or unlocking positions yet to allow the ring shaped member 115 to be moved to its other position by finger action. Thus the spring 133, ball 135 and slots 125A and 125B provide means for releasably holding the ring shaped member 115 in either its locking or unlocking positions.

Figure 8:
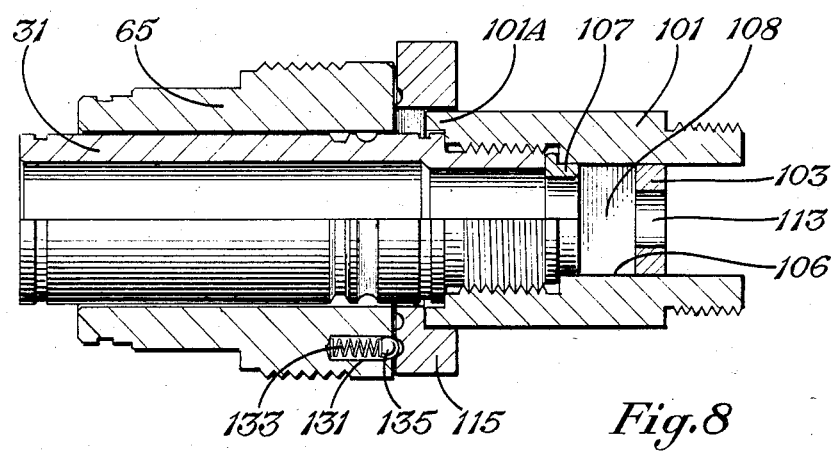
FIG. 8 is a partial cross sectional view similar to that of FIG. 6 but with the locking ring in its unlocked position and with the movable sleeve of the test probe in its rearward position.

The radius R of the inner surface 125C of the key 125 relative to the central axis 115A of the ring shaped member 115 is greater than the maximum outer radius of the tubular member 31. The inside diameter D of the ring shaped member 115 is greater than the maximum outside diameter of the member 101. When ring shaped member 115 is in its unlocking position and the sleeve 65 is moved to its rearward position, the ring shaped member 115 is located around the forward portion of the member 101 as shown in FIG. 8. In the rearward position of the sleeve 65, its rear end 65A abuts against the forward end 101A of the member 101.

The purpose of the word "Lock" on the edge 115B of the ring shaped member 115 is to enable the user to know that the member 115 can be locked by pushing against the edge 115B when the sleeve 65 is in its forward position.

The slot 123A in key 123 serves no useful purpose. It is formed during the process of cutting the slot 125B and is not removed.

Referring also to FIGS. 16-28, there will described the fittings of the invention and their cables and the manner in which the fittings are secured to each other and to the test probes. The armored cables are commercially available. They are formed of spirally wound metal strips forming flexible and hollow high strength cables which are used in the invention to provide strong and durable conduits for electrical leads for connection to the test probes. In FIGS. 1-5, one of the armored cables is identified at 105. It is connected to a fitting 103 which in turn is secured to the test probe 21.

Figure 16:
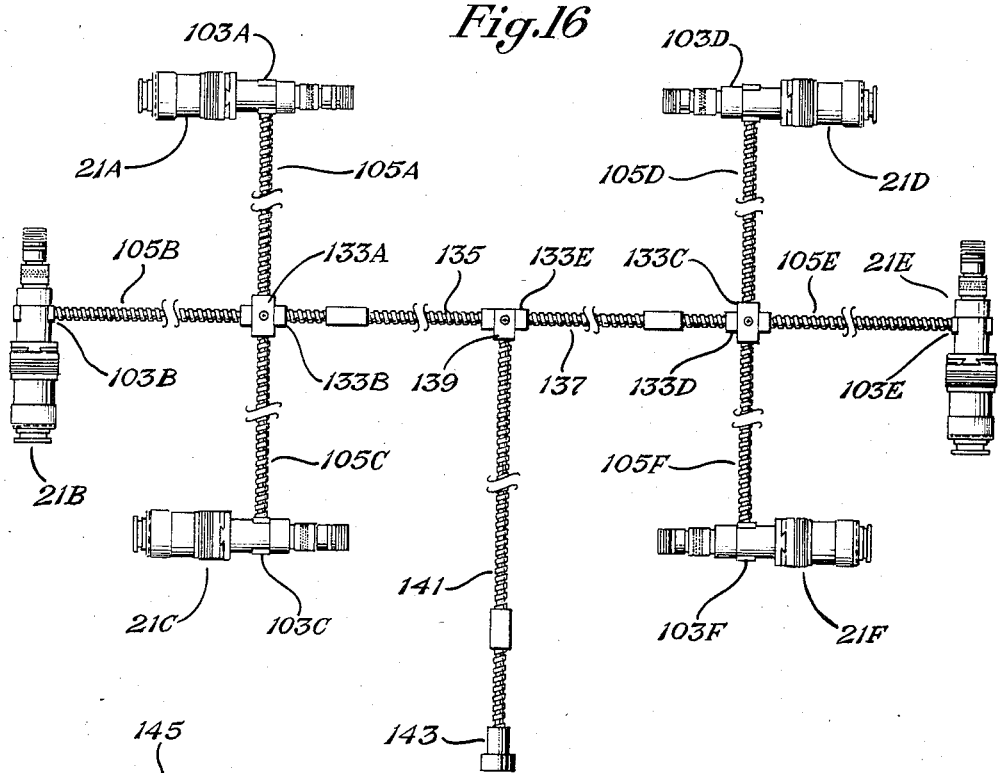
FIG. 16 is an assembly of test probes connected together by armored cables.

In FIG. 16, an assembly of the test probes 21A-21F connected to their armored cables 105A-105F is shown. Each of the probes 21A-21F is essentially the same. The ends of the cables 105A-105F are connected to the ends of fittings 103A-103F respectively which in turn are secured to the probes 21A-21F. Each of the fittings 103A-103F is the same as the fitting 103 shown in FIG. 22. The other ends of the cables 105A-105F are connected to the ends of fittings 133A-133D as shown in FIG. 16. Fittings 133A and 133B are coupled together and fittings 133C and 133D are coupled together. Each of the fittings 133A-133D is the same as fitting 133 shown in FIGS. 24-26. The ends of armored cables 135 and 137 are connected to the ends of fittings 133B and 133D and to the ends of fitting 133E. Fitting 133E is the same as fitting 133 and is coupled to a fitting 139 which is of the type shown at 139 in FIGS. 27 and 28. An armored cable 141 has one end connected to fitting 139 and its other end connected to a connector 143.

Figure 17:
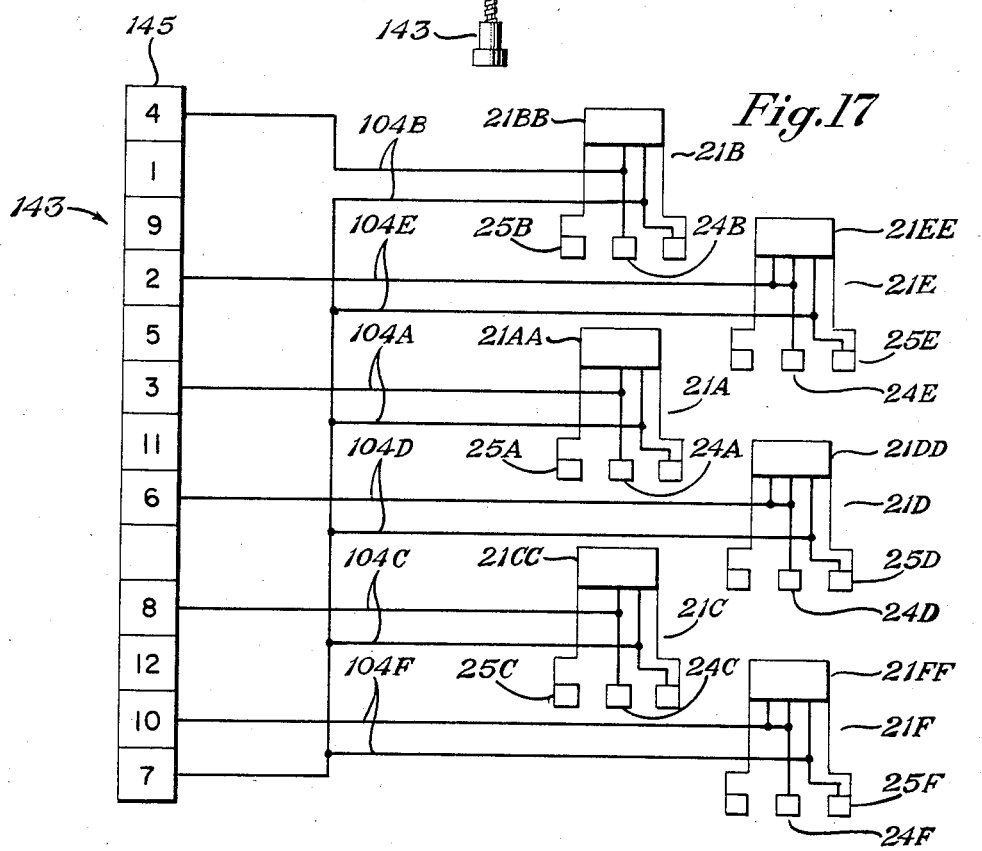
FIG. 17 is an electrical wiring diagram of the assembly of test probes of FIG. 16.

The wiring diagram of the assembly of test probes of FIG. 16 is shown in FIG. 17. The center contacts of the probes 21A-21F are shown at 24A-24F respectively and the outer annular contacts of the probes are shown at 25A-25F respectively. Members 21AA-21FF are rear connectors of the probes 21A-21F to which the forward contacts 24A-24F and 25A-25F are connected. The rear connectors are located in tubular member 111 of the probes and are connectible to test equipment. The pairs of electrical leads of the probes are shown at 104A-104F. They are coupled to the contacts of their probes and to pins indicated at 145 of the connector 143. The six pairs of leads 104A–104F extend from the connector 143 through the cable 141 to the fittings 133E and 139. From the fittings 133E and 139, three pairs of leads 104A–104C branch off and extend through cable 135 and the other three pairs of leads 104D–104F branch off and extend through the cable 137. From the fittings 133A and 133B, leads 104A–104C branch off and extend through their cables 105A–105C to their probes 21A–21C respectively. From the fittings 133C and 133D, leads 104D–104F branch off and extend through cables 105D–105F to their probes 21D–21F.

Figure 18:
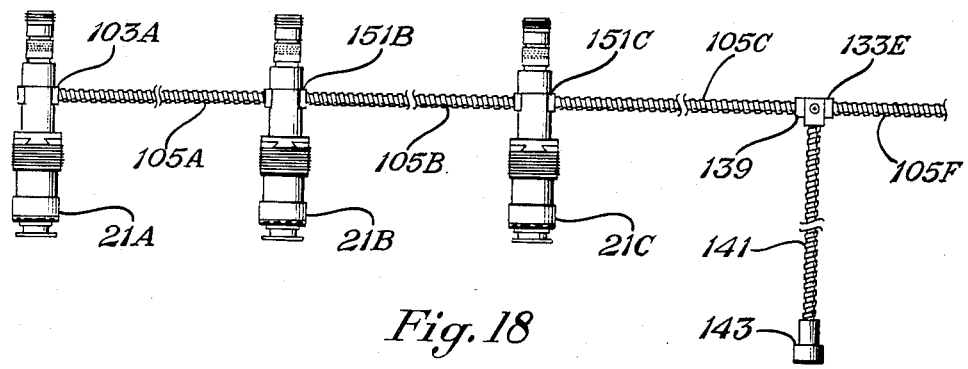
FIG. 18 is a partial assembly of test probes connected together in another manner by armored cables.
Figure 20:
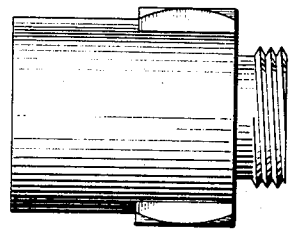
FIG. 20 is a side view of the sleeve of FIG. 19 with the fitting located in the slot of the sleeve.
Figure 19:
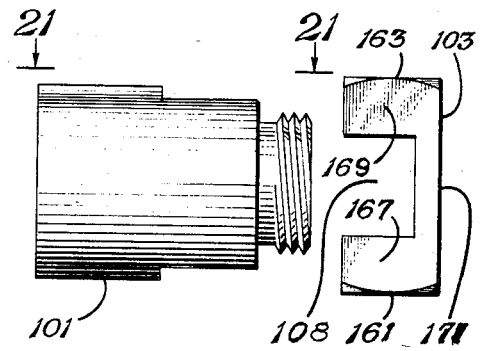
FIG. 19 is an exploded view of one of the fittings of the invention and a sleeve of a test probe to which the fitting is to be connected.
Figure 22:
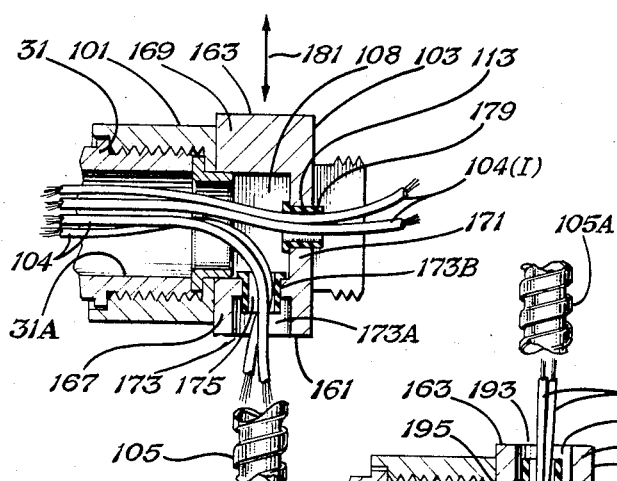
FIG. 22 is a cross sectional view of the sleeve and fitting of FIG. 19 with the fitting located in the slot of the sleeve and with the sleeve coupled to the rear end of the tubular body of FIG. 5.
Figure 21:
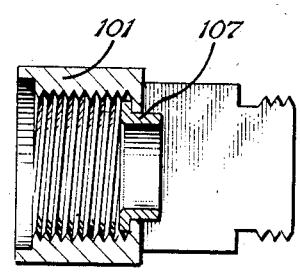
FIG. 21 is a cross section of the sleeve of FIG. 19 taken along the lines 21—21 thereof.

Referring now to FIG. 18, the test probe assembly comprises the six test probes 21A–21E of FIG. 16; however, only three of the test probes 21A–21C are shown. The difference in the assembly of FIG. 18 from that of FIG. 16 is the manner in which the test probes are connected to the cables and the manner in which the electrical leads extend through the cables and some of the test probes. Test probe 21A, its fitting 103A and its cable 105A are the same as that of FIG. 16; however, in the assembly of FIG. 18, the other end of the cable 105A is connected to an end of a fitting 151B of test probe 21B. The cable 105B is connected to the other end of the fitting 151B and then to the end of a fitting 151C of test probe 21C. The cable 105C is connected to the other end of fitting 151C and then to the fitting 139. The other three test probes 21D–21F are connected in a similar manner. The fittings 151B and 151C are the same as fitting 151 shown in FIG. 23. The six pairs of electrical leads 104A–104F extend from the connector 143 through the cable 141 to the fittings 133E and 139. From the fittings 133E and 139, three pairs of leads 104A–104C branch off and extend through cable 105C and the other three pairs of leads 104D–104F branch off and extend through the cable 105F. Leads 104C are connected to the test probe 21C. The other two pair of leads 104B and 104A extend through the fitting 151C and through cable 105B to the fitting 151B. The leads 104B are connected to the test probe 21B and the other pair of leads 104A extend through the fitting 151B and through the cable 105A and are connected to the test probe 21A. The three pairs of leads 104D–104F extend to their probes 21D–21F in a similar manner.

Referring to FIGS. 5 and 19–22, there will be described in more detail one of the fittings 103 and the manner in which the fitting is secured to a test probe. The fitting 103 is formed of metal. It has two opposite ends 161 and 163 and a slot 108 formed through the fitting between its two ends defining two spaced apart structural portions 167 and 169 extending from the same side of a base portion 171. An aperture 173 extends through the structural portion 167 between its end 161 and the slot 108. The aperture 173 comprises an enlarged portion 173A and a smaller portion 173B. One end of the cable 105 is inserted into the enlarged portion 173A of the aperture 173 and bonded therein for example by brazing. An electrically insulating tubular member 175 extends through the smaller aperture portion 173B. The aperture 113 is formed through the base portion 171 and has an electrically insulating tubular member 179 located therein. In assembling the fitting 103 to the member 101, the fitting is located in the slot 106 of the member 101 such that the slot 108 of the fitting 103 is in communication with the central opening 101C of the member 101 and hence in communication with the central opening 31A of the tubular body 31. The bushing 107 has an enlarged diameter portion 107A and a smaller diameter portion 107B with an opening 107C extending therethrough between the enlarged portion and the smaller portion. The bushing 107 is located within the central opening 101C of the member 101 until its enlarged portion 107A abuts against a shoulder 101B of the member 101. In this position, the smaller diameter portion 107B extends into the slot 106 of the member and within the slot 108 of the fitting 103 preventing the fitting 103 from being removed from the slot 106 by movement in either of the directions indicated by the arrows 181 in FIG. 22. The electrical leads 104 extending through the cable 105 extend through the aperture 173 and insulating tube 175 of the fitting 103 and through the central opening 101C of the member 101 and the central opening 31A of the tubular body 31 to the contacts 24A and 25A of the probe 21A. Electrical leads 104(I) are connected to the leads 104 inside the tubular body 31 and extend through the tubular member 179 and the aperture 113 to the rear connector of the probe 21A. The fitting 103 is secured in place by screwing the member 109 onto the threads formed at the rear of the member 101 until the forward end of the member 109 abuts against the rear end of the fitting 103.

Figure 23:
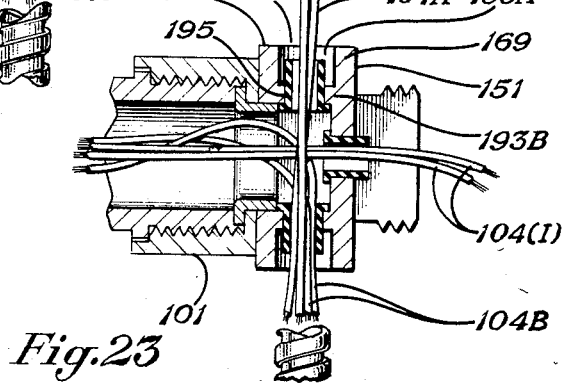
FIG. 23 is a view similar to that of FIG. 22 but with a fitting of a different embodiment located in the slot of the sleeve.

Referring now to FIG. 23, the fitting 151 is the same as fitting 103 except that an aperture 193 extends through the structural portion 169 between its end 163 and the slot 108. The aperture 193 comprises an enlarged portion 193A and a smaller portion 193B. One end of a cable 105 is inserted into the enlarged portion 193A of the aperture 193 and bonded therein, for example, by brazing. An electrically insulating tubular member 195 extends through the smaller aperture portion 193B. The purpose of the aperture 193 is to allow passage of other pairs of leads through the fitting 151, for example, when employed as fitting 151B of the assembly of FIG. 18. In this embodiment, leads 104A extend through the apertures 173 and 193 of the fitting 151B to the probe 21A by way of cable 105A.

Figure 24:
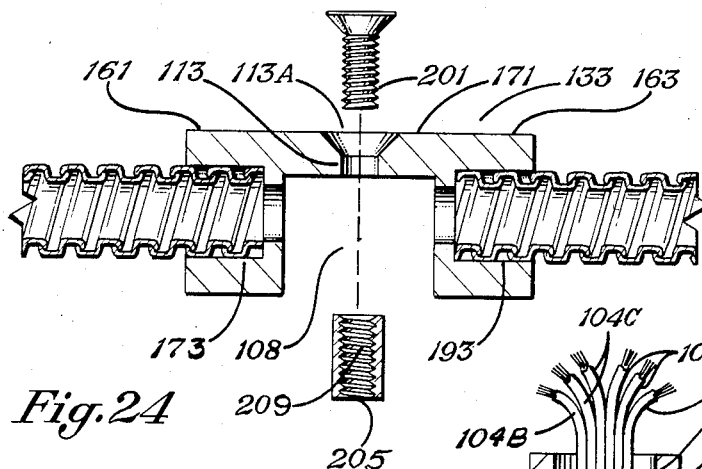
FIG. 24 is a cross sectional view of a fitting of the invention with the ends of armored cables connected to the opposite ends of the fitting.
Figure 25:
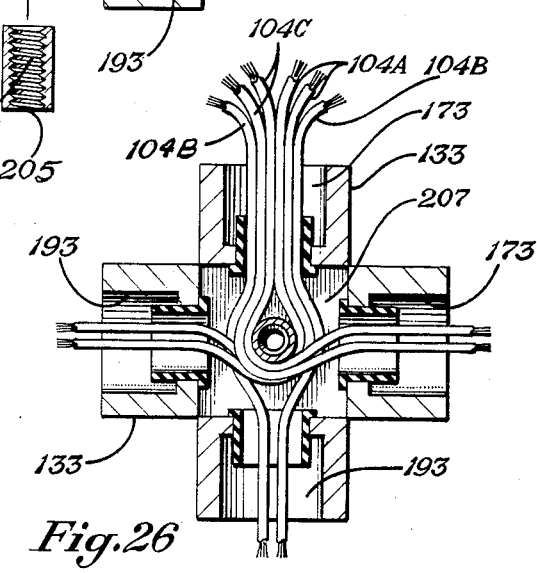
FIG. 25 is an exploded view of two fittings of the invention to be secured together transverse to each other.
Figure 26:
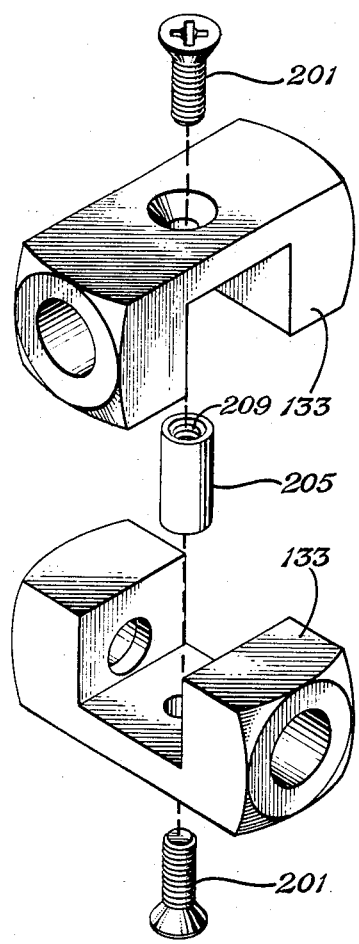
FIG. 26 is a cross sectional view of two fittings of the invention secured together transverse to each other and illustrating electrical leads extending through the apertures and slots of the sleeves.

Referring now to FIGS. 24–26, each of the fittings 133 is the same as fitting 151 except the aperture 113 formed through the base portion 171 is countersunk at 113A for receiving a cone shaped head of a bolt 201. The fittings 133 may be secured together transverse to each other as shown in FIGS. 25 and 26 with the use of bolts 201 and a stand-off member 205 to form a chamber 207. In this connecting arrangement, the inside surfaces of the base portions 171 of two of the fittings 133 face each other and the stand-off member 205 has two opposite ends which engage the central portions of the base portions 171. The stand-off member 205 has a threaded aperture 209 formed therethrough. Bolts 201 then are inserted through the apertures 113 of the fittings and screwed into the opposite ends of the stand-off members 205 to secure the fittings together. The chamber 207 is formed between the inner walls of the structural portions 167 and 169 and the base portions 171 of the two fittings which define their two slots 108. The chamber 207 has four openings defined by the apertures 173 and 193 of the two fittings for the passage of electrical leads. The stand-off member 205 not only supports the two fittings in this manner to form the chamber 207 but it forms a guiding member for guiding the electrical leads through the chamber. For example, in FIG. 26, the three pairs of electrical leads 104A–104C are shown extending through the aperture 173 of one of the fittings 133 into the chamber 207 and then around the stand-off member 207 for passage through the other three apertures of the two fittings for extension to their test probes by way of their cables. This type of fitting assembly is the same as that of FIG. 16 wherein fittings 133A and 133B are connected together and fittings 133C and 133D are connected together.

Figure 27:
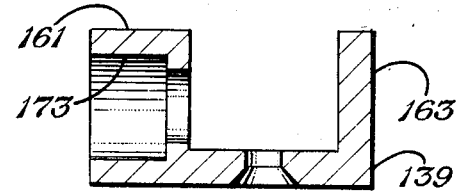
FIG. 27 is a cross sectional view of another embodiment of a fitting of the invention.
Figure 28:
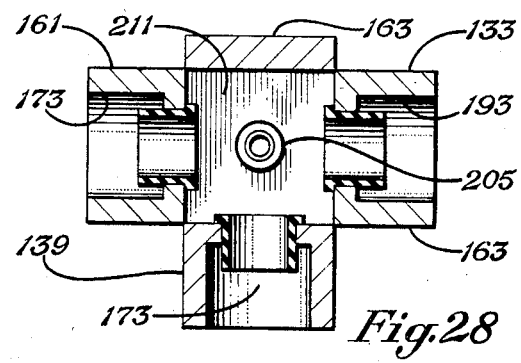
FIG. 28 is a cross sectional view of a fitting of FIG. 27 and a fitting of FIG. 26 secured together transverse to each other.

Referring to FIG. 27, the fitting 139 is the same as fitting 133 except that its structural portion 163 is relatively thin and has no aperture formed therethrough. The fitting 139 may be connected with a fitting 133 with a stand-off member 205 and two bolts 201 in the same manner as two fittings 133 are connected together as shown in FIGS. 25 and 26 to form a chamber 211 having only three openings for the passage of electrical leads. Two of the fittings 133 and 139 may be connected together and used as the fitting assembly 133E and 139 of FIG. 16 to provide passages for all of the wires through the opening 173 of fitting 139 to the central chamber 211 where they are bent around the stand off member and divide to two different branches as described with respect to FIG. 16.

Thus as can be understood, the different types of fittings with their armored cables form high strength passageways for electrical leads. The fittings may be readily connected together to form different types of intersecting passageways for the leads and to test probes for providing passageways for the leads to the probes.

I claim:

1. An armored cable and fitting for electrical leads, comprising:
    a fitting member having first and second opposite ends,
    a slot formed through said fitting member between said first and second opposite ends defining first and second spaced-apart structural portions extending from the same side of a base portion such that said fitting member is generally C-shaped as seen from two opposite sides thereof,
    said first structural portion being between said slot and said first end and said second structural portion being between said slot and said second end,
    an aperture extending through said first structural portion between said first end of said fitting member and said slot,
    said aperture having an enlarged portion next to said first end and a smaller portion next to said slot,
    a flexible hollow cable located in said enlarged portion of said aperture and bonded to said first structural portion of said fitting member such that the interior of said cable is in communication with said slot by way of said aperture.

2. The armored cable and fitting of claim 1, comprising:
    an aperture formed through said base portion between said first and second spaced-apart structural portions.

3. Armored cables and fittings for electrical leads, comprising:
    first and second fitting members,
    said first fitting member comprising:
        a structural member having two opposite ends,
        a slot formed through said first fitting member between its two opposite ends defining two spaced-apart structural portions extending from the same side of a base portion,
        an aperture extending through one of said structural portions between its end of said first fitting member and said slot, and
        a flexible hollow cable secured to said one structural portion at its end of said first fitting member such that the interior of said cable is in communication with said slot by way of said aperture,
    said second fitting member comprising:
        a structural member having two opposite ends,
        a slot formed through said second fitting member between its two opposite ends defining two spaced-apart structural portions extending from the same side of a base portion,
        an aperture extending through each of said structural portions between its end of said second fitting member and said slot, and
        a flexible hollow cable secured to each of said structural portions at its end of said second fitting member such that the interior of each of said cables is in communication with said slot by way of the aperture of the structural portion to which the cable is secured,
    said two fittings members being coupled together transverse to each other such that their base portions between their two structural portions face each other and their slots form a chamber,
    a stand-off member located in said chamber,
    said stand-off member having opposite ends secured to the central portions of said base portions of said two fitting members respectively such that said stand-off member secures said two fitting members together with their base portions spaced apart from each other to define said chamber with said stand-off member being located in the central portion of said chamber.

4. The armored cables and fittings of claim 3, comprising:
    a plurality of electrical leads extending through one of said cables to said chamber, and
    a number of said leads less than said plurality of leads extending from said chamber to each of the other of said cables.

5. The armored cables and fittings of claim 3, wherein:
    each of said base portions of said two fitting members between their two structural portions has an aperture formed therethrough,
    said stand-off member has a threaded aperture formed in each of its ends,
    said stand-off member is secured to said central portions of said base portions of said two fitting members by two threaded members which extend through the apertures formed through the base portions of said two fitting members and are screwed into the threaded apertures formed in opposite ends of said stand-off member respectively.

6. The armored cables and fittings of claim 5, comprising:
    a plurality of electrical leads extending through one of said cables to said chamber, and
    a number of said leads less than said plurality of leads extending from said chamber to each of the other of said cables,
    said leads in said chamber extending around said stand-off member to their respective cables.

7. Armored cables and fittings for electrical leads, comprising:
    first and second fitting members,
    said first fitting member comprising:
        a structural member having two opposite ends,
        a slot formed through said first fitting member between its two opposite ends defining two spaced-apart structural portions extending from the same side of a base portion, an aperture extending through each of said structural portions between its end of said first fitting member and said slot, and a flexible hollow cable secured to each of said structural portions at its end of said first fitting such that the interior of each of said cables is in communication with said slot by way of the aperture of the structural portion to which the cable is secured, said second fitting member comprising:

a structural member having two opposite ends, a slot formed through said second fitting member between its two opposite ends defining two spaced-apart structural portions extending from the same side of a base portion, an aperture extending through each of said structural portions between its end of said second fitting member and said slot, and a flexible hollow cable secured to each of said structural portions at its end of said second fitting member such that the interior of each of said cables is in communication with said slot by way of the aperture of the structural portion to which the cable is secured, said two fittings members being coupled together transverse to each other such that their base portions between their two structural portions face each other and their slots form a chamber, a stand-off member located in said chamber, said stand-off member having opposite ends secured to the central portions of said base portions of said two fitting members respectively such that said stand-off member secures said two fitting members together with their base portions spaced apart from each other to define said chamber with said stand-off member being located in the central portion of said chamber.

8. The armored cables and fittings of claim 7, comprising:

a plurality of electrical leads extending through one of said cables to said chamber, and a number of said leads less than said plurality of leads extending from said chamber to each of the other of said cables.

9. The armored cables and fittings of claim 7, wherein:

each of said base portions of said two fitting members between their two structural portions has an aperture formed therethrough, said stand-off member has a threaded aperture formed in each of its ends, said stand-off member is secured to said central portions of said base portions of said two fitting members by two threaded members which extend through the apertures formed through the base portions of said two fitting members and are screwed into the threaded apertures formed in opposite ends of said stand-off member respectively.

10. The armored cables and fittings of claim 9, comprising:

a plurality of electrical leads extending through one of said cables to said chamber, and a number of said leads less than said plurality of leads extending from said chamber to each of the other of said cables, said leads in said chamber extending around said stand-off member to their respective cables.

11. A test probe apparatus comprising:

a body having a central opening extending from at least one end of said body, a tubular member having one end coupled to said one end of said body such that the interior of said tubular member is in communication with said central opening, a slot formed through the other end of said tubular member transverse to the axis thereof, a fitting member having two opposite ends, a slot formed through said fitting member between said two opposite ends defining two spaced-apart structural portions extending from the same side of a base portion, an aperture extending through one of said structural portions between its end of said fitting member and said slot of said fitting member, a flexible hollow cable secured to said one structural portion at its end of said fitting member such that the interior of said cable is in communication with said slot by way of said aperture, said fitting member being located in said slot of said tubular member such that said slot of said fitting member is in communication with said central opening of said body by way of said tubular member with said base portion of said fitting member between said two structural portions facing said central opening of said body, a bushing member having an opening formed therethrough between an enlarged end and a smaller end, said enlarged end of said bushing member being held between said one end of said body and structure of said tubular member with the smaller end of said bushing extending into said slot of said tubular member and into said slot of said fitting member, and means secured to said other end of said tubular member for holding said fitting member within said slot of said tubular member.

12. The test probe apparatus of claim 11, comprising:

electrical leads extending through said cable to said slot of said fitting member for connection to electrical components of a test probe.

13. The test probe apparatus of claim 11, wherein:

said base portion of said fitting member between said two structural portions has an aperture formed therethrough for the passage of electrical leads.

14. The test probe apparatus of claim 11, wherein:

said means secured to said other end of said tubular member is screwed to threads formed on said other end of said tubular member.

15. A test probe apparatus comprising:

a body having a central opening extending from at least one end of said body, a tubular member having one end coupled to said one end of said body such that the interior of said tubular member is in communication with said central opening, a slot formed through the other end of said tubular member transverse to the axis thereof, a fitting member having two opposite ends, a slot formed through said fitting member between said two opposite ends defining two spaced-apart structural portions extending from the same side of a base portion, an aperture extending through each of said structural portions between its end of said fitting member and said slot of said fitting member, a flexible hollow cable secured to each of said structural portions at its end of said fitting member such that the interior of each of said cables is in communication with said slot by way of the aperture of the structural portion to which the cable is secured, said fitting member being located in said slot of said tubular member such that said slot of said fitting member is in communication with said central opening of said body by way of said tubular member with said base portion of said fitting member between said two structural portions facing said central opening of said body, a bushing member having an opening formed therethrough between an enlarged end and a smaller end, said enlarged end of said bushing member being held between said one end of said body and structure of said tubular member with the smaller end of said bushing extending into said slot of said tubular member and into said slot of said fitting member, and means secured to said other end of said tubular member for holding said fitting member within said slot of said tubular member.

16. The test probe apparatus of claim 15, comprising:
a plurality of electrical leads extending through one of said cables to said slot of said fitting member, a number of said leads less than said plurality of leads extending from said slot of said fitting member into said central opening of said body, the remainder of said plurality of leads extending from said slot of said fitting member to the other of said cables.

17. The test probe apparatus of claim 15, wherein:
said base portion of said fitting member between said two structural portions has an aperture formed therethrough for the passage of electrical leads.

18. The test probe apparatus of claim 15, wherein:
said means secured to said other end of said tubular member is screwed to threads formed on said other end of said tubular member.

19. Armored cables and fitting for electrical leads, comprising:
a fitting member having first and second opposite ends, a slot formed through said fitting member between said first and second opposite ends defining first and second spaced-apart structural portions extending from the same side of a base portion such that said fitting member is generally C-shaped as seen from two opposite sides thereof, said first structural portion being between said slot and said first end and said second structural portion being between said slot and said second end, a first aperture extending through said first structural portion between said first end of said fitting member and said slot, said first aperture having an enlarged portion next to said first end and a smaller portion next to said slot, a first flexible hollow cable located in said enlarged portion of said first aperture and bonded to said first structural portion of said fitting member such that the interior of said first cable is in communication with said slot by way of said first aperture, a second aperture extending through said second structural portion between said second end of said fitting member and said slot, said second aperture having an enlarged portion next to said second end and a smaller portion next to said slot, and a second flexible hollow cable located in said enlarged portion of said second aperture and bonded to said second structural portion of said fitting member such that the interior of said second cable is in communication with said slot by way of said second aperture.

20. The armored cables and fitting of claim 19, comprising:
an aperture formed through said base portion between said first and second spaced-apart structural portions.

* * * * *